(12) United States Patent
Gupta et al.

(10) Patent No.: US 12,024,213 B2
(45) Date of Patent: Jul. 2, 2024

(54) SYSTEM AND METHOD OF ELECTRICAL CONNECTION OF RAIL VEHICLE FOR STORING, TRANSPORTING AND DELIVERING ELECTRIC ENERGY

(71) Applicants: Ranjan Kumar Gupta, Bothell, WA (US); Ravisekhar Nadimpalli Raju, Clifton Park, NY (US); David J Eaglesham, Lexington, MA (US)

(72) Inventors: Ranjan Kumar Gupta, Bothell, WA (US); Ravisekhar Nadimpalli Raju, Clifton Park, NY (US); David J Eaglesham, Lexington, MA (US)

( * ) Notice: Subject to any disclaimer, the term of this patent is extended or adjusted under 35 U.S.C. 154(b) by 163 days.

(21) Appl. No.: 17/541,167

(22) Filed: Dec. 2, 2021

(65) Prior Publication Data

US 2023/0174123 A1 Jun. 8, 2023

(51) Int. Cl.
*B61L 27/16* (2022.01)
*B60L 9/00* (2019.01)
*B60L 50/60* (2019.01)
*B60L 53/00* (2019.01)
(Continued)

(52) U.S. Cl.
CPC ............. *B61L 27/16* (2022.01); *B60L 9/00* (2013.01); *B60L 50/60* (2019.02); *B60L 53/00* (2019.02);
(Continued)

(58) Field of Classification Search
CPC ........ B61L 27/16; B61L 25/028; B61L 27/40; B61L 27/70; B61L 25/025; B60L 9/00;
(Continued)

(56) References Cited

U.S. PATENT DOCUMENTS

| 3,037,462 A | * | 6/1962 | Barry | ............ B61L 25/04 246/86 |
| 5,129,605 A | * | 7/1992 | Burns | ............ B61L 25/023 246/5 |

(Continued)

FOREIGN PATENT DOCUMENTS

| WO | WO 2010/042659 A1 | 4/2010 | |
| WO | WO-2015110669 A2 * | 7/2015 | ............ B60L 53/32 |

*Primary Examiner* — Kurt Philip Liethen

(57) ABSTRACT

A system for connecting and disconnecting rail vehicle system for storing, transporting, and delivering bulk electric energy using railroads is described. The system includes. The system includes at least one rail vehicle system. The rail vehicle system includes a locomotive and a group of rail cars. The group of rails cars includes several rail cars with energy storage, power electronics and communication system. The rail car further includes a pantograph. The system also includes a plurality of electrical feeders. The electrical feeders are substantially dedicated for providing power transfer to and from the respective groups of rail cars. The system further includes at least one position controls system. The position control system is configured to be coupled to the geographical location of at least one electrical feeder, and it is substantially dedicated for aligning the geographical location of at least one group of rail cars with the geographical location of the respective electrical feeders for the group of rail cars. The system further includes energy management system for the controls of charging and discharging of onboard energy storage on the rail vehicle system.

7 Claims, 8 Drawing Sheets

(51) Int. Cl.
 B61L 25/02 (2006.01)
 B61L 27/40 (2022.01)
 B61L 27/70 (2022.01)

(52) U.S. Cl.
 CPC .............. B61L 25/028 (2013.01); B61L 27/40 (2022.01); B61L 27/70 (2022.01); *B60L 2200/26* (2013.01)

(58) Field of Classification Search
 CPC ...... B60L 50/60; B60L 53/00; B60L 2200/26; B60L 15/38; B60M 3/00
 See application file for complete search history.

(56) References Cited

U.S. PATENT DOCUMENTS

| | | | |
|---|---|---|---|
| 5,788,033 A * | 8/1998 | Lucking | B60M 1/12 191/11 |
| 5,969,643 A * | 10/1999 | Curtis | B61L 15/0072 340/988 |
| 6,523,654 B2 * | 2/2003 | Brooks | B60L 5/00 323/215 |
| 6,612,245 B2 | 9/2003 | Kumar | |
| 7,162,337 B2 * | 1/2007 | Peltz | B61L 3/125 701/19 |
| 8,027,760 B2 * | 9/2011 | Chattot | B60L 53/53 701/22 |
| 8,371,230 B2 | 2/2013 | Kumar | |
| 8,791,589 B2 * | 7/2014 | Colello | B60L 53/51 307/9.1 |
| 8,825,239 B2 * | 9/2014 | Cooper | B61L 15/0036 701/19 |
| 11,034,261 B2 * | 6/2021 | Landreth | B60L 5/18 |
| 2011/0315043 A1 * | 12/2011 | Kumar | B60L 9/28 105/35 |
| 2020/0207376 A1 * | 7/2020 | Schuhholz | B60L 50/53 |
| 2020/0207377 A1 * | 7/2020 | Schuhholz | B60M 7/003 |

* cited by examiner

Fig. 1 Prior-art

SYSTEM AND METHOD OF ELECTRICAL CONNECTION OF RAIL VEHICLE FOR STORING, TRANSPORTING AND DELIVERING ELECTRIC ENERGY

CROSS-REFERENCE TO RELATED APPLICATION(S)

This application claims priority to provisional U.S. Patent Application No. 63/120,707, filed Dec. 2, 2020, titled "SYSTEM AND METHOD OF ELECTRICAL CONNECTION OF RAIL VEHICLE FOR STORING, TRANSPORTING AND DELIVERING ELECTRIC ENERGY", which is hereby incorporated by reference.

FIELD OF THE INVENTION

The field of the invention relates generally to systems, apparatus, and methods for non-wire transmission and distribution of electric energy. More specifically, at least some of the embodiments described herein relates to systems, apparatus, and methods for connecting and disconnecting rail vehicle system for storing, transporting, and delivering bulk electric energy using railroads.

BACKGROUND OF THE INVENTION

The 19th century electrical T&D infrastructure is becoming a bottleneck for the 21st century clean energy transition using renewable energy (solar, wind etc.) sources and cleaner loads. The key reason is that lower capacity factor renewables (due to intermittency) and lower load factor loads (e.g. high demand and short power peaks from fast charging EVs) are requiring more T&D infrastructure. At the generation level, due to the rapidly falling cost of renewable energy, the coal and gas plants (that provides the necessary reliability and availability of energy to the power system) are expected to retire faster, leaving more void to be filled from the system reliability and availability perspectives, requiring even more investment in T&D infrastructure. The trend is up: The average retail electricity rate for the consumers has been increasing and expected to continue to increase as the clean energy transition would require more T&D investments to deliver the same amount of clean energy to the consumers.

Another key issue is speed of clean energy transition: how to achieve rapid transformation of T&D infrastructure. While theoretically it is possible to add more lines, substations etc.—the regulatory approvals, interconnection studies and other processes to realize these changes are not designed to support rapid clean transition.

Overall, the cost of delivering electric energy using T&D infrastructure is projected to increase. The clean energy transition is expected to be slow. The consumers are expected to pay a green premium for clean energy consumption. Therefore, there is a growing need for an alternate non-wire technology for delivering electric energy, not only for the cost-effective delivery but also for the expeditious transition to higher penetration of clean energy in the power system.

Energy delivery using a non-wire transportation infrastructure, as a complementary solution to electrical T&D: Transportation of electric energy from a power system node (e.g. power generation source) at a first location to another power system node (e.g. a load, commercial or industrial facility) at a different location (different than first location) is generally preferred when electric transmission and distribution (T&D) infrastructure does not exist between those two locations or the T&D infrastructure is unavailable due to outage from an extreme events such as natural calamity. In these circumstances, storing, transporting, and then delivering electric energy using a truck is cheaper and more reliable. The cost and reliability are not key considerations since transporting energy using trucks is the only option. The magnitude of energy delivery is generally limited to a couple of MWhs per day (equivalent to powering approximately 100 houses per day in the US). The cost per kWh of such a delivery system is generally orders of magnitude more than the cost of electricity from a utility grid (if available).

For mainstream applications such as energy delivery to a large consumers base of 100s of commercial and industrial consumers, or 100,000 residential customers, or in general to deliver the energy equivalent to a mid-size coal or gas power plants, 1000s of MWh per day delivery is required in order to match with the delivery capability of a typical utility electrical T&D. Incidentally, such a large magnitude of energy delivery per day also increases the cost competitiveness of energy delivery using transportation infrastructure. Although several theoretical concepts exist in the literature, the practical implementation of 1000s of MWh of clean energy transportation per day, from a source at one location to a load at another location, does not exist. The key requirements for the feasibility of such as system are that in less than 24 hours perform all the necessary operations such as: charging (storing energy) and discharging (using the stored energy) of 1000s of MWh energy storage and round-trip commute between the source and end-use. Therefore, 100s of MW of power is required to realize the charging and discharging of 1000s of MWh every day. Further, such a large 100s of MW power carrying capable transportable energy system should be able to connect and disconnect a few times daily. As a reference, such as large 100s of MW gas or coal plants connects and disconnects only a few times in a year for schedule maintenance purposes—the switchgears are not designed for daily operation. Therefore, for transportation of energy to be meaningful for mainstream application and match the capability and cost effectiveness of an electrical T&D system, the transportable system and underlying infrastructure at the source and end-use locations need to be able to 1) fast charge 1000s of MWh in short time, ideally less than 6-8 hours, and 2) connect/disconnect 100s of MW of power on a daily basis, in addition to the fundamental necessity of being able to move 1000s of MWh energy from the first location (source) to the second location (end-use). Such a requirement creates special challenges from all aspects—energy density, ability to fast connect and disconnect, ability to fast charge and discharge etc. in a transportable energy system.

The proposed innovation attempts to solve all the above problem to create a practically feasible and implementable energy transportation system using railroad. For more than a century, a rail vehicle system has been used for delivering feedstock to generating power plants such as coal from coal mines to coal power plants; oil and gas from refineries to gas power plants; etc. The proposed innovation disclosed herein is based on the same principle to transport clean energy from a large-scale wind plant (or any other generating source) to a location for end-use, enabled by innovation in system, apparatus and methods for connecting, disconnecting, storing, and moving bulk electric energy.

SUMMARY OF THE INVENTION

In one aspect, a system for transferring power to or from a transportable bulk-energy-storage is provided. The system includes at least one rail vehicle system. The rail vehicle system includes at least one locomotive and at least one group of rail cars. At least one rail car in at least one group of rails cars includes at least one electric energy storage system. At least one rail car in at least one group of rails cars includes at least one power electronics and communication system. At least one rail car in at least one group of rails cars further includes at least one robotic arm like a pantograph in a conventional electric locomotive. The system also includes a plurality of electrical feeders. The electrical feeders are substantially stationary, and they are configurable to be coupled to the respective groups of rail cars. The electrical feeders are substantially dedicated for providing power transfer to and from the respective groups of rail cars. The robotic arm of at least one rail car in at least one group of rail cars in at least one rail vehicle system is configured to connect to the respective electric feeder for the group of rail cars. The system further includes at least one position controls system. The position control system is configured to be coupled to the geographical location of at least one electrical feeder, and it is substantially dedicated for aligning the geographical location of at least one group of rail cars with the geographical location of the respective electrical feeders for the group of rail cars. The system further includes at least one rail track. The rail track is substantially aligned with the geographical location of electrical feeders. The electrical feeders are connected to at least one power system node for providing power transfer to and from the power system node. The power system node can be a generating node or load node or a simple power system bus.

In a further aspect, a method of using a system for transferring power to or from a transportable bulk-energy-storage is provided. The system includes at least one rail vehicle system. The rail vehicle system includes at least one locomotive and at least one group of rail cars. At least one rail car in at least one group of rails cars includes at least one electric energy storage system. At least one rail car in at least one group of rails cars includes at least one power electronics system. At least one rail car in at least one group of rails cars further includes at least one robotic arm like a pantograph in a conventional electric locomotive. The system also includes a plurality of electrical feeders. The system further includes at least one position controls system. The position control system is configured to be coupled to the geographical location of at least one electrical feeder, and it is substantially dedicated for aligning the geographical location of at least one group of rail cars with the geographical location of the respective electrical feeders for the group of rail cars. The system further includes at least one rail track. The electrical feeders are connected to at least one power generating node. The method includes measuring location of electrical feeders along with the location of groups of rail cars. The method further includes determining the distance between the electrical feeders and the respective groups of rail cars. The method includes facilitating communication to the at least one locomotive to move to substantially align the locations of the groups of rail cars with the locations of respective electrical feeder for connecting the robotic arm of at least one rail car to the electrical feeder. The method further includes communication among the at least one rail car and at least one power generating node to facilitate the control of power to and from the at least one energy storage system in the at least one rail car. In another embodiment, the method further includes sequential engagement of the robotic arms of the rail cars to the respective electrical feeders to reduce the power system inrush current. In yet another embodiment, the method further includes measuring the state of charge of energy storage systems, and measuring the location of rail cars, to prioritize the engage of respective rail cars connection to the electrical feeder. In another embodiment, the method includes forecasting the available energy from the power system node over a period of time and then using this information to charge the selected energy storage system in respective rail cars, and not charge the remaining energy storage systems in their respective rail cars, and then facilitating the selection of a portion of rail cars of the rail vehicle system for transporting to another location.

In one aspect, a system for transporting bulk-energy-storage is provided. The system includes at least one rail vehicle system. The rail vehicle system includes at least one locomotive and at least one group of rail cars. At least one rail car in at least one group of rails cars includes at least one electric energy storage system. At least one rail car in at least one group of rails cars includes at least one power electronics and communication system. At least one rail car in at least one group of rails cars further includes at least one robotic arm like a pantograph in a conventional electric locomotive. The system also includes a plurality of electrical feeders at a first location. The system also includes a plurality of electrical feeders at a second location different from the first location. The first location and the second location are connected to each other with at least one railroad. The electrical feeders at both the first and second locations are substantially stationary, and they are configurable to be coupled to the respective groups of rail cars in at least one group of rail cars in at least one rail vehicle system. The electrical feeders at both the first and second locations are substantially dedicated for providing power transfer to and from the respective groups of rail cars. The robotic arm of at least one rail car in at least one group of rail cars in at least one rail vehicle system is configured to connect to the respective electric feeder for the group of rail cars. The system further includes at least one position controls system. The position control system is configured to be coupled to the geographical location of at least one electrical feeder, and it is substantially dedicated for aligning the geographical location of at least one group of rail cars with the geographical location of the respective electrical feeders for the group of rail cars. The system further includes at least one rail track at the first location. The rail track is substantially aligned with the geographical location of electrical feeders. The system further includes at least one rail track at the second location. The rail track is substantially aligned with the geographical location of electrical feeders at the second location. The electrical feeders at the first location are connected to at least one power system node for providing power transfer to and from the power system node. The power system node can be a generating node or load node or a simple power system bus. The electrical feeders at the second location are connected to at least one power system node for providing power transfer to and from the power system node. The power system node can be a generating node or load node or a simple power system bus. At least one rail vehicle system is configured to transport energy storage systems from the first location to the second location; and transport energy storage systems from the second location to first location.

In a further aspect, a method of using a system for transporting bulk-energy-storage is provided. The system includes at least one rail vehicle system. The rail vehicle system includes at least one locomotive and at least one group of rail cars. At least one rail car in at least one group of rails cars includes at least one electric energy storage system. At least one rail car in at least one group of rails cars includes at least one power electronics and communication system. At least one rail car in at least one group of rails cars further includes at least one robotic arm like a pantograph in a conventional electric locomotive. The system also includes a plurality of electrical feeders at a first location. The system also includes a plurality of electrical feeders at a second location different from the first location. The first location and the second location are connected to each other with at least one railroad. The electrical feeders at both the first and second locations are substantially stationary, and they are configurable to be coupled to the respective groups of rail cars in at least one group of rail cars in at least one rail vehicle system. The electrical feeders at both the first and second locations are substantially dedicated for providing power transfer to and from the respective groups of rail cars. The robotic arm of at least one rail car in at least one group of rail cars in at least one rail vehicle system is configured to connect to the respective electric feeder for the group of rail cars. The system further includes at least one position controls system. The position control system is configured to be coupled to the geographical location of at least one electrical feeder, and it is substantially dedicated for aligning the geographical location of at least one group of rail cars with the geographical location of the respective electrical feeders for the group of rail cars. The system further includes at least one rail track at the first location. The rail track is substantially aligned with the geographical location of electrical feeders. The system further includes at least one rail track at the second location. The rail track is substantially aligned with the geographical location of electrical feeders at the second location. The electrical feeders at the first location are connected to at least one power system node for providing power transfer to and from the power system node. The power system node can be a generating node or load node or a simple power system bus. The electrical feeders at the second location are connected to at least one power system node for providing power transfer to and from the power system node. The power system node can be a generating node or load node or a simple power system bus. The method includes forecasting the amount of energy transfer required at the first location over a period. The method also includes forecasting the amount of energy transfer required at the second location over a period. The method includes performing economic optimization of buying and selling energy at the first and second locations, evaluation of logistics to determine the round-trip time between the first and second location, and the calculation of charging and discharging time of the transportable energy storage in at least one rail vehicle system. The method also includes forecasting the amount of energy transportable between the first location and the second location. In another embodiment, the method further includes measuring the state of charge of energy storage systems and measuring the location of rail cars, to prioritize the engagement of respective rail cars connection to the electrical feeder for charging the selected energy storage system in respective rail cars, and not charge the remaining energy storage systems in their respective rail cars, and then facilitating the selection of a portion of rail cars of the rail vehicle system for transporting between the first and second location.

In another aspect, a system for transporting bulk-energy-storage between a power system node at a first location and an intermodal transportation facility at a second location different than first location is provided. The system includes at least one rail vehicle system. The rail vehicle system includes at least one locomotive and at least one group of rail cars. At least one rail car in at least one group of rails cars includes at least one electric energy storage system. At least one rail car in at least one group of rails cars includes at least one power electronics and communication system. At least one rail car in at least one group of rails cars further includes at least one robotic arm like a pantograph in a conventional electric locomotive. The at least one energy storage system, at least one power electronics and communication system, at least one robotic arm like a pantograph in at least one rail car is detachable and movable to a truck at an intermodal transportation facility at a second location. The system also includes a plurality of electrical feeders at a first location. The first location and the second location are connected to each other with at least one railroad. The electrical feeders at the first locations is substantially stationary, and they are configurable to be coupled to the respective groups of rail cars in at least one group of rail cars in at least one rail vehicle system. The electrical feeders at the first location are substantially dedicated for providing power transfer to and from the respective groups of rail cars. The robotic arm of at least one rail car in at least one group of rail cars in at least one rail vehicle system is configured to connect to the respective electric feeder for the group of rail cars. The system further includes at least one position controls system. The position control system is configured to be coupled to the geographical location of at least one electrical feeder, and it is substantially dedicated for aligning the geographical location of at least one group of rail cars with the geographical location of the respective electrical feeders for the group of rail cars. The system further includes at least one rail track at the first location. The rail track is substantially aligned with the geographical location of electrical feeders. The system further includes at least one rail track at the second location. The electrical feeders at the first location are connected to at least one power system node for providing power transfer to and from the power system node. The power system node can is a generating node or a simple power system bus. At least one rail vehicle system is configured to transport energy storage systems from the first location to the second location; and transport energy storage systems from the second location to first location.

BRIEF DESCRIPTION OF THE DRAWING

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Figure 1:
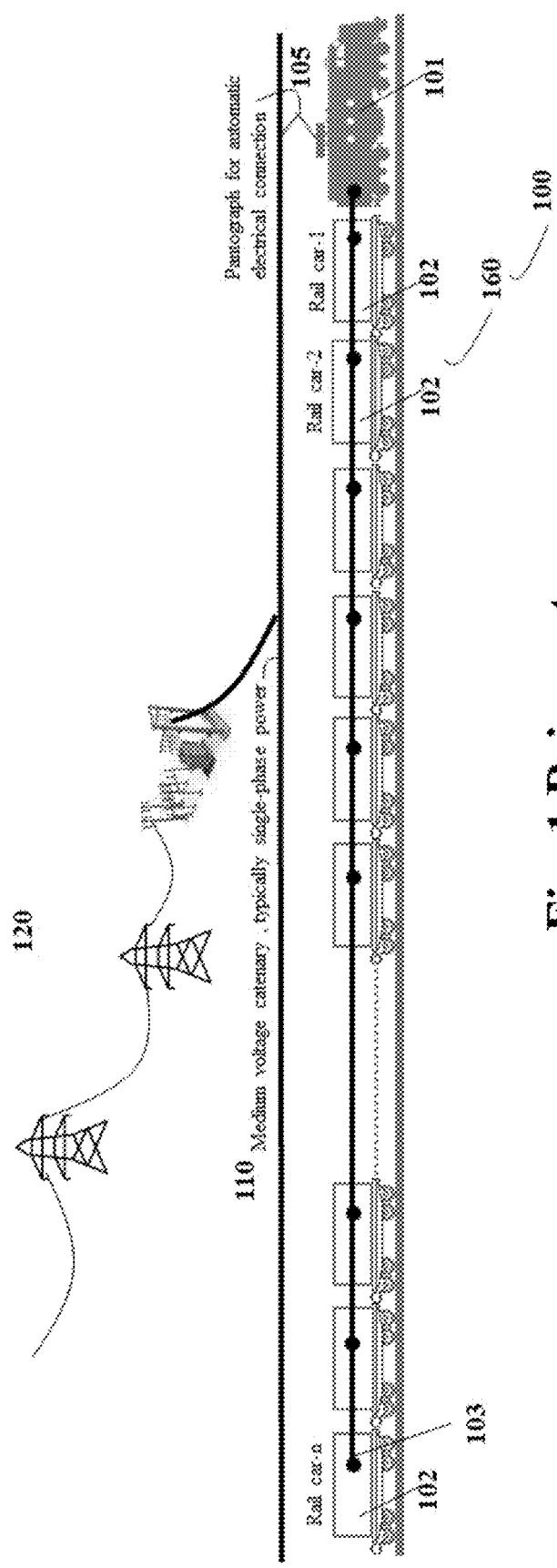
FIG. 1 illustrates a prior art which is practically infeasible for bulk energy storage transportation daily

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise FIG. 1 illustrates a prior-art, an obvious system 100 and method to connect and transport bulk energy storage on rail vehicle system 160 comprised of components 101, 102, 103 and 105 as described in detail later in this paragraph. Due to the large freight carrying capability of the rail cars 102 and locomotive 101, it is possible to install over a thousand of MWh of electric energy storage system (for example Li-ion battery packs) distributed over one hundred rail cars 102, as an example. The rail vehicle system 160 is designed to haul bulk freight daily. So, hauling bulk energy storage between two location is obvious. However, what is not obvious is performing the same every day in that 1000s of MWh is first charged from a source at one location and then delivered for end-use at another location. The key issue is extremely long time to charge and discharge such a bulk amount of energy storage. To illustrate this bottleneck, consider the following example: 1) A typical electrical locomotive 101 draws approximately 5 MW of power from the overhead medium voltage catenary 110 using the pantograph 105. The power supply to 110 comes from the power system 120. The highest in class medium voltage for the catenary 110 is between 20 to 35 kV. For such a medium voltage class and given the power rating of electrical locomotive 101, approximately 30 MW to 40 MW is available for charging the onboard bulk energy storage, after performing a major overhaul of the railway catenary 110 from a single phase (prior-art) to three phase power and assuming that several locomotives 101 can be used in series—let's assume that it is possible. A simple calculation can be performed to determine the charging time of 1000 MWh storage from a 35 MW power source (say instead of one, seven locomotives are used—just for the illustration purposes to demonstrate the limitation of such a system); The charging time is equal to =1000 MWh/35 MW=approximately 28 hours, which exceeds a day. Now, add the discharging time for end-use of transported energy at another location; and, then add the commute time (let's say it is not more than a few hundred miles). To perform one round-trip transportation of 1000 MWh energy from one location to another location would require a minimum of 56 hours plus time to commute, connect and disconnect the transportable system. Hence, the prior-art 100 is practically not feasible for round-trip transportation of 1000s of MWh in a day.

Theoretically, it is possible to simply increase the voltage of the catenary system 110 and the Pantograph 105 to over 230 kV and thereby decrease the charging and discharging time, due to very high power now available due to much higher voltage system such as a 230 kV three-phase system. However, practically, such system is cost prohibitive to implement since the locomotive 101 and all rail cars 102 will now be required to handle 10 times more voltage (meaning more clearance for safety for connections 103, which also means less space of freight). Such high voltage system technology will also require very specialized high voltage connectors to perform connect and disconnect operation daily. As such, there is no system in the state-of-the-art at such a high voltage (over 230 kV) which performs daily connect and disconnect operations to the power system.

Figure 2:
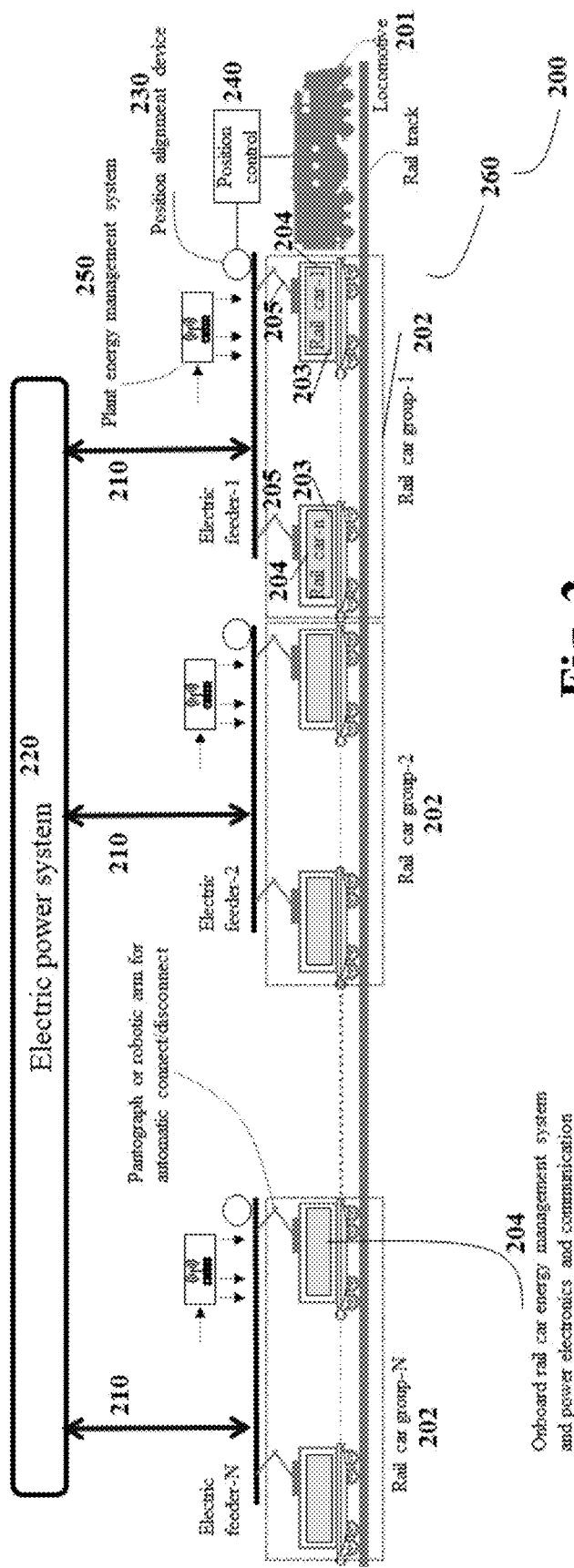
FIG. 2 illustrates an embodiment of a system for transferring power to or from a transportable bulk-energy-storage

FIG. 2 illustrates an embodiment of a transportable bulk energy storage system 200 for exchanging bulk power. The system includes groups of rail cars (Rail car group-1 to Rail car group-N) connected to at least one locomotive 201. Each group of rail cars 202 can have several rail cars 203 (Rail car-1 to Rail car-n). The rail cars includes onboard energy storage system (such as Li-ion battery packs) and onboard power electronics and communication system 204. The rail cars further include a pantograph or similar robotic arm 205 for three-phase electrical connection to facilitate charging or discharging of the onboard energy storage system 204 (shown as a box in FIG. 2). Several electrical feeders 210 (which are installed at one location, substantially stationary) connected to an electric power system 220 on one end of the feeder are configured to directly couple with the groups of rail cars at the other end of the feeder, as shown in FIG. 2. For example, in one of the embodiment, Rail car group-1 202 is connected to Electrical feeder-1 210 only such that Electrical feeder-1 is dedicated to provide power exchange with the onboard energy storage systems 204 in Rail car group-1; Likewise Rail car group-N is connected to Electrical feeder-N only such that Electrical feeder-N is dedicated to provide power exchange with the onboard energy storage systems in Rail car group-N.

The system also includes a position control device 230 and a position control system 240. The position controls system ensures that when a rail vehicle system 260 (defined as locomotive 201 plus rail cars 203 including all components of rail cars 204, 205) arrives for charging or discharging, the respective rail car groups 202 is geographically aligned with their respective electrical feeders 210 such that when pantograph 205 open the arm to connect to electrical feeder 210, it automatically connects with the correct electrical feeder; for example: pantograph of Rail car group-1 connects with Electric feeder-1; pantograph of Rail care group-N connects with Electrical feeder-N. Such as scheme enables direct power exchange with the groups of rail cars.

The following numerical examples illustrates how such a system enables charging or discharging of 1000s of MWh in less than 8 hours. Each electrical feeder 210 is a medium voltage feed, say 25 to 35 kV. As illustrated previously, each feeder 210 is capable to provide 30-40 MW to each rail car groups. In each rail car group, all rail cars can independently connect to the respective electrical feeder and independently exchange power using their pantograph (for connect/disconnect) and onboard power electronics and communication system 204. Assume there are 120 rail cars 203 in a rail vehicle system 260. Each group of rail cars 202 comprises six rail cars 203. Therefore, there are 20 groups 202 that can be independently powered from their respective 20 electrical feeders 210, making 20×35 MW=700 MW power available for charging all the onboard energy storage 204 simultaneously, resulting in less than two hours to charge 1000 MWh. It is important to note that such dramatic reduction in charging time (less than 2 hours relative to more than 24 hours in prior-art) is enabled by a combination of innovations: 1) new configuration or rail cars 203 with their own pantograph 205, 2) changes in the configuration of electrical catenary system which now have several electrical medium voltage feeders 210, each capable of providing 10s of MW power, 3) position controls system 240 and the position alignment device 230 that aligns the mobile rail cars 203 and pantograph 205 to their respective electrical feeders 210, and 4) a controls system 250 that is explained in the subsequent paragraph.

As another embodiment, the system includes a plant energy management system 250. The plant energy management system monitors the required power that can be exchanged between the Electric power system 220 (as shown in FIG. 2) and the rail vehicle system 260. The plant energy management system 250 communicates with onboard rail energy management system inside the onboard energy storage system 204, facilitating an independent and controlled amount of power exchange between rail cars 203 (with onboard energy storage 204) and the respective electrical feeders 210 and thereby power exchange with Electric power system 220.

In yet another embodiment, a smooth connection of rail vehicle system 260 to the electric power system 220 is illustrated with the help of FIG. 2. The pantograph 205 of rail cars 203 can be sequentially connected to the feeders 210 to reduce the electrical power surge which is the key reason why several large power system well known in the art are not connected and disconnected frequently (e.g. daily). However, due to the distributed nature of the power system and flexibility of the independent connection of each of the rail cars to the electrical feeder using their respective pantographs allows sequential controls to reduce the electrical surge. As an example, pantographs of all rail cars 203 in Rail car group-1 202 can be connected first, followed by (say wait for a few seconds or less) connection of all pantographs in Rail car group-2 and so on.

Figure 3:
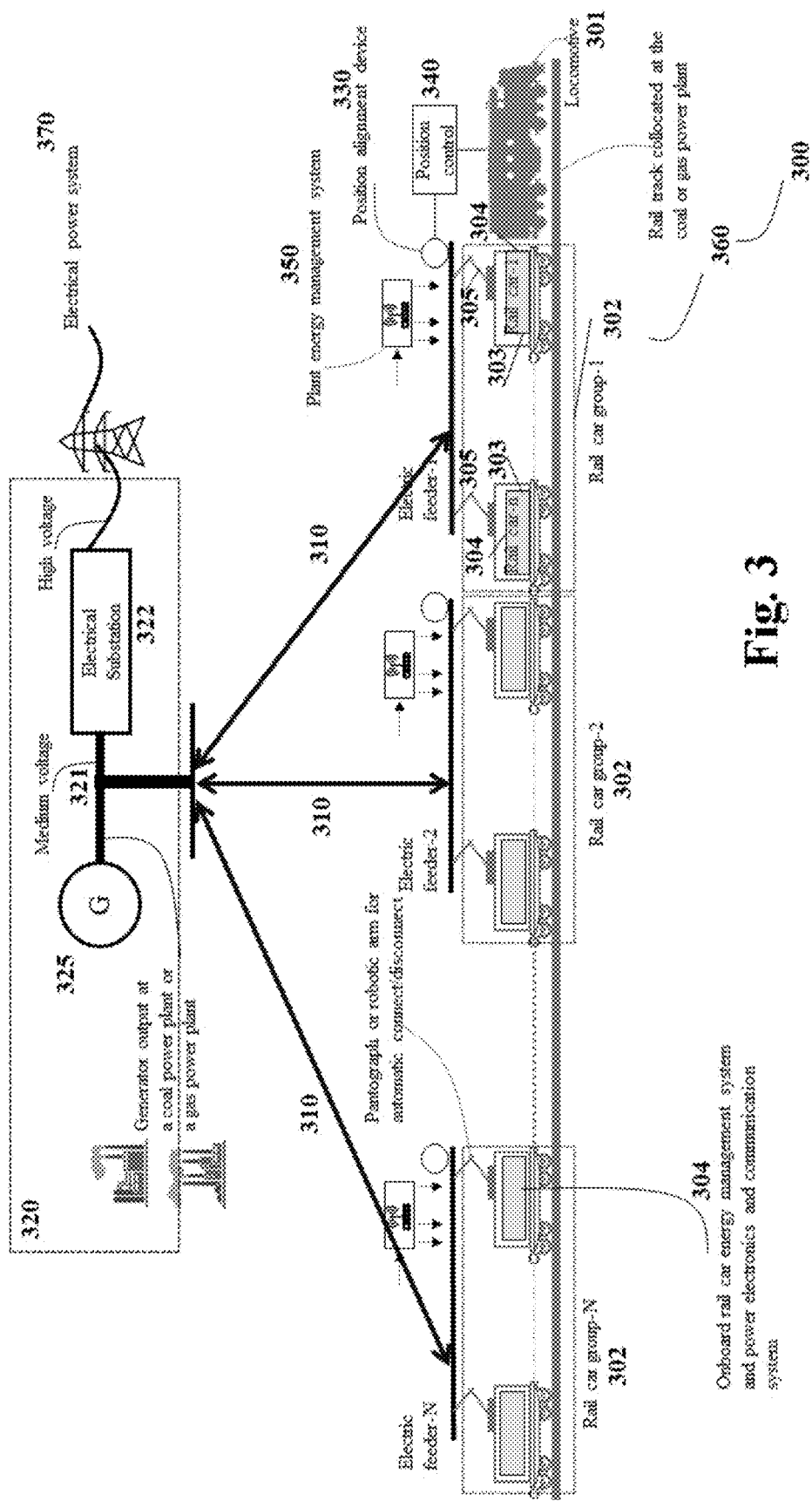
FIG. 3 illustrates another embodiment of a system for transferring power to or from a transportable bulk-energy-storage, and a system for transporting bulk energy storage

FIG. 3 illustrates another embodiment of the system 300 in which the electrical feeders 310 are connected at the low side 321 (example 25 kV output from the electrical generator) of the substation 322, enabling a power exchange between a thermal power plant (coal or gas for example) 320 and the rail vehicle system 360. The rail vehicle system is parked with the onboard energy storage systems 304 that are substantially charged at another location for the delivery of energy to the thermal power plant 320. The Plant energy management system 350 communicates with the constraints of the thermal power plant generation and withdraws power from the energy storage systems 304 on the rail vehicle system 360 to transmit to the electrical power system 370 as shown in FIG. 3. Such scheme augment or reduces the output of thermal generation for advantageously reducing the carbon emission, reducing the cost of overall energy exported to the electrical power system, and increase the revenue from the exported energy to the electrical power system by advantageously providing fast responding ancillary services (enabled by transportable energy storage) such as response to operating reserves and frequency regulations well known in the art.

While not shown explicitly in FIG. 3, the thermal management system of the thermal power generation facility 320 can be used to provide cooling to the onboard energy storage systems 304 for the rail vehicle system 360. In another embodiment, a coolant loop from the locomotive 301 with one end of the loop receives coolant from the thermal power plant 320 and the other end of the loop distributes the coolant to the rail cars 303 for thermal management of the energy storage system 304. The coolant loop is like the hydraulic loop for braking of the rail cars. Such a scheme advantageously increases the availability of energy in the transportable energy storage in that more energy can be injected to the electric power system for increasing the revenue from the sales of energy.

Figure 4:
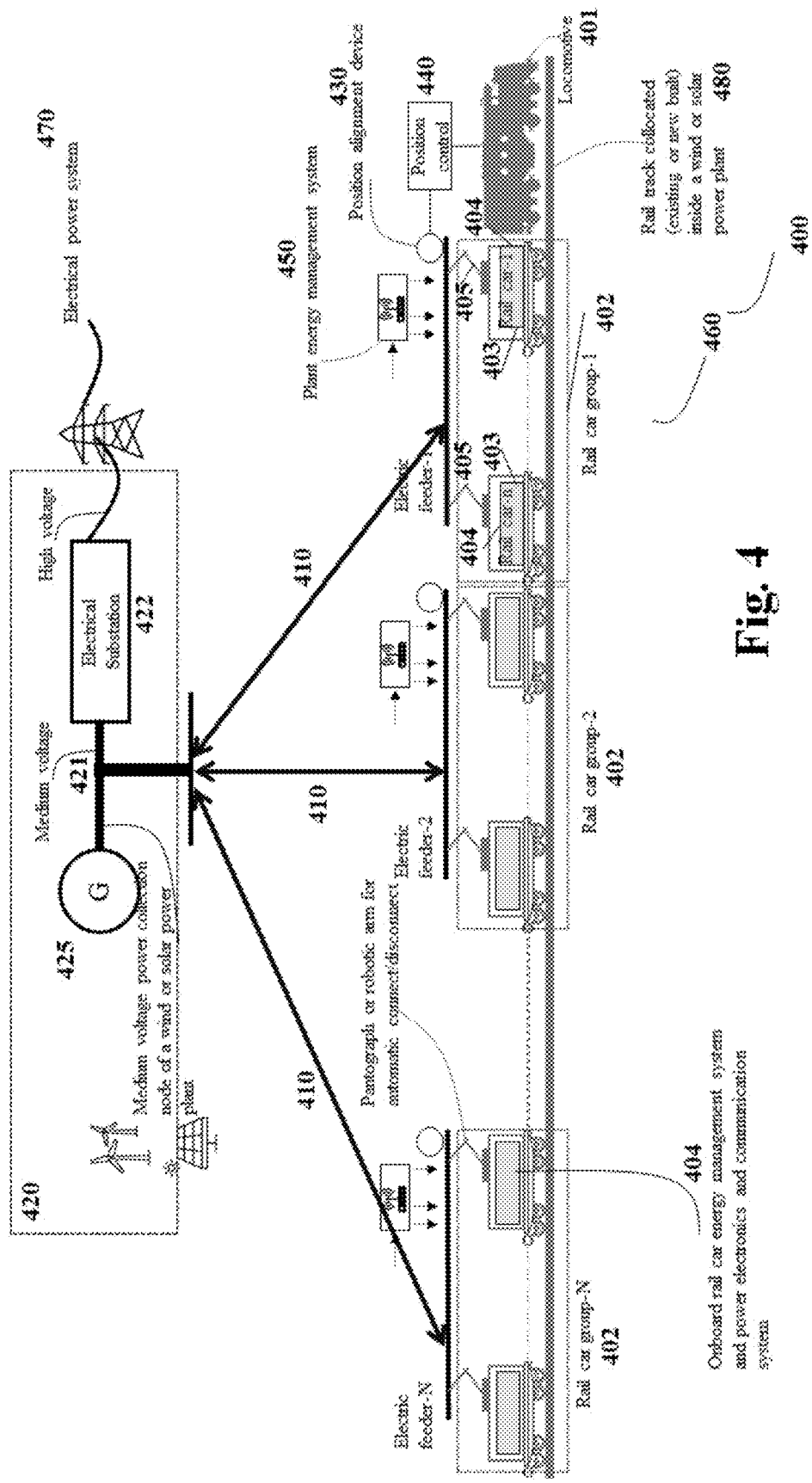
FIG. 4 illustrates another embodiment of a system for transferring power to or from a transportable bulk-energy-storage, and a system for transporting bulk energy storage

FIG. 4 illustrates another embodiment of the system 400 in which the electrical feeders 410 are connected at the low side 421 (example 35 kV or 69 kV output from the medium voltage power collection system of solar or wind farm) of the substation 422, enabling a power exchange between a renewable power plants 420 and the rail vehicle system 460. The rail vehicle system 460 arrives at the renewable power plant 420 for charging the onboard energy storage system 404 from the renewable power plant 420. The Plant energy management system 450 communicates with the renewable power plant and facilitate the supply of power to the energy storage systems 404 on the rail vehicle system 460 for charging. Based on the constraints of the electrical power system 470, the plant controls system 450 further facilitate the supply of power from the electrical power system 470 to the transportable energy storage systems 404 on the rail vehicle system 460, as shown in FIG. 4. Such a scheme allows export of renewable energy to the rail vehicle system for delivering the clean energy at another location such as the coal or gas power plant mentioned in the previous paragraph, or to another location for end-use. While charging from the renewable power plant, the rail vehicle system can advantageously provide fast responding ancillary services (enabled by transportable energy storage) such as response to operating reserves and frequency regulations well known in the art. Such a scheme not only allows charging of transportable energy storage from low-cost renewable energy but also creates revenue for the renewable power plants from the power market by offering energy, capacity and ancillary services to the electrical power system.

While not shown explicitly in FIG. 4, a renewable power plant design in future can include a rail track 480 and all necessary provisions (such as electrical feeders 410, position controls system 430, 440 etc. shown in FIG. 4) to facilitate power exchange with a rail vehicle system 460 comprising transportable bulk energy storage 404, as another embodiment.

Further, while not shown explicitly in either FIG. 3 or FIG. 4, a system for transporting bulk-energy-storage is illustrated by using both FIG. 3 and FIG. 4, as another embodiment. The rail vehicle system with onboard energy storage is charged in the night at a wind farm (say in less than 8 hours) and discharges during the day at a thermal power plant (say for up to 8 hours) that is located less than a few hundred miles, creating a system for transporting bulk energy storage (renewable power plants). from a first location to a second location (coal or gas plants). One of the reason to select coal or gas power plants as the second location for transporting energy storage is for creating a retrofit system, considering announcement of the retirement of several coal and gas power plants. By using the railroads and existing power system infrastructure and substation at the coal or gas plants (which otherwise could be wasted), a cheaper and cleaner alternative can be generating clean energy from the same coal or gas power plant node, by transporting energy using a rail vehicle system from a renewable power plant.

Further, not shown explicitly in FIG. 3 or FIG. 4, if the total energy available for charging over a period is less than the sum of the capacity of all energy storage systems on the rail cars of a rail vehicle system then a priority charging method is used, as another embodiment. The prioritization methods charges the energy storage systems on rail cars to maximize the amount of energy on board and minimize the number of rail cars. As an example, if only 840 MWh energy is available for charging over a period at the first location, and if the charging capacity of energy storage system on the rail vehicle system is 1000 MWh over the same period then only 84% of the rail cars are connected to the electrical feeders for charging their respective onboard energy storage, as a priority. The remaining 16% rail cars and their respective energy storage systems onboard are not charged. At the end of 840 MWh charging, those 16% of the rail cars are not transported by the rail vehicle system to another location, saving transportation cost and time.

Figure 5:
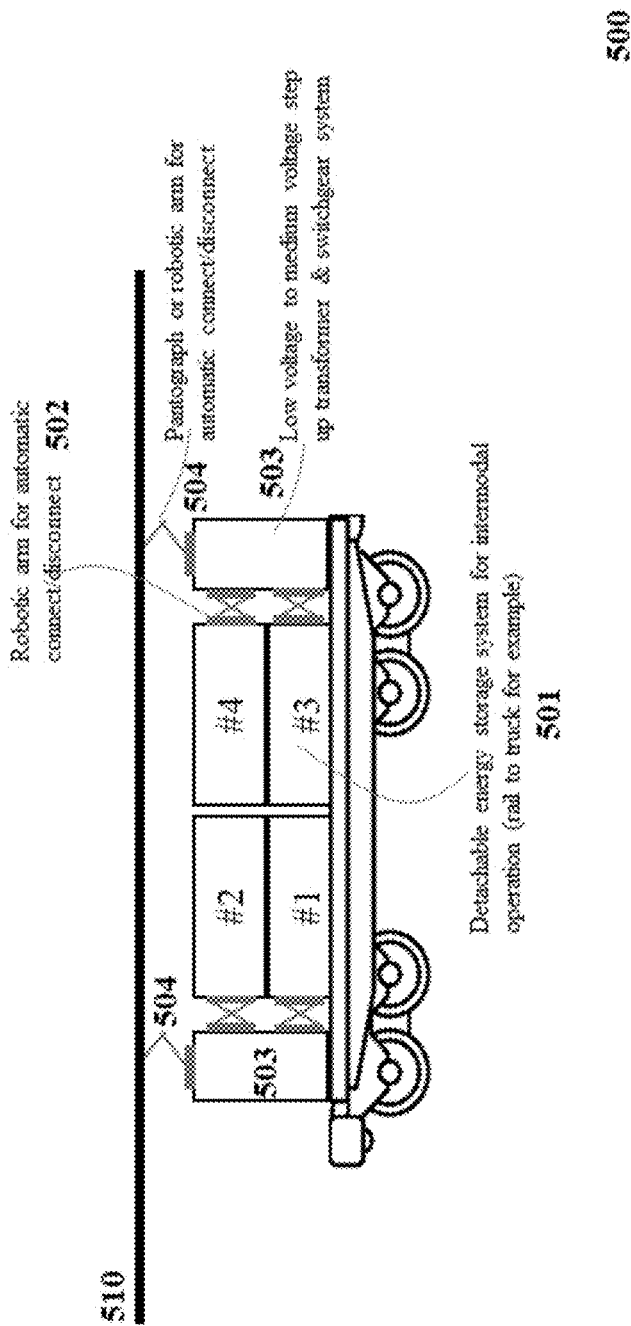
FIG. 5 illustrates another embodiment of the rail car in a rail vehicle system for transporting bulk energy storage systems for intermodal operation

FIG. 5 illustrates another embodiment of the rail car 500 in a rail vehicle system for transporting bulk energy storage systems. The rail car system 500 includes detachable energy storage systems 501 with their own robotic arm 502 for electrical connection to a low voltage to medium voltage step up transformer and switchgear system 503. The energy storage system 501 includes onboard power electronics and communication system. The transformer and switchgear system 503 includes a pantograph 504 that is used to connect to the electrical feeders to facilitate the power transfer between a detachable energy storage system and an electric feeder. When arranged as shown in FIG. 5, energy storage systems 501 can be stacked on top of each other (example #2 on top of #1), which is advantageous for intermodal transportation in that the energy storage systems can be easily lifted and loaded to a truck at the intermodal transportation facility (say at a second location). Such a unique packaging and assembly of robotics arm 502, energy storage systems 501, and the transformer and switchgear system 503 allows the use of standard shipping containers for energy storage system such that both rail transportation and truck transportation are easily accomplished while complying to the transportation regulatory requirements and simultaneously maximizing the amount of onboard energy storage. The transformer and switchgear systems stay 503 on the rail car at the intermodal transportation facility. On the other hand, at the first location where the energy storage system is charged, the robotics arms 502 of the energy storage systems 501 are connected to the transformer and switchgear system, which is followed by connection of pantograph to the electrical feeder for charging.

Figure 6:
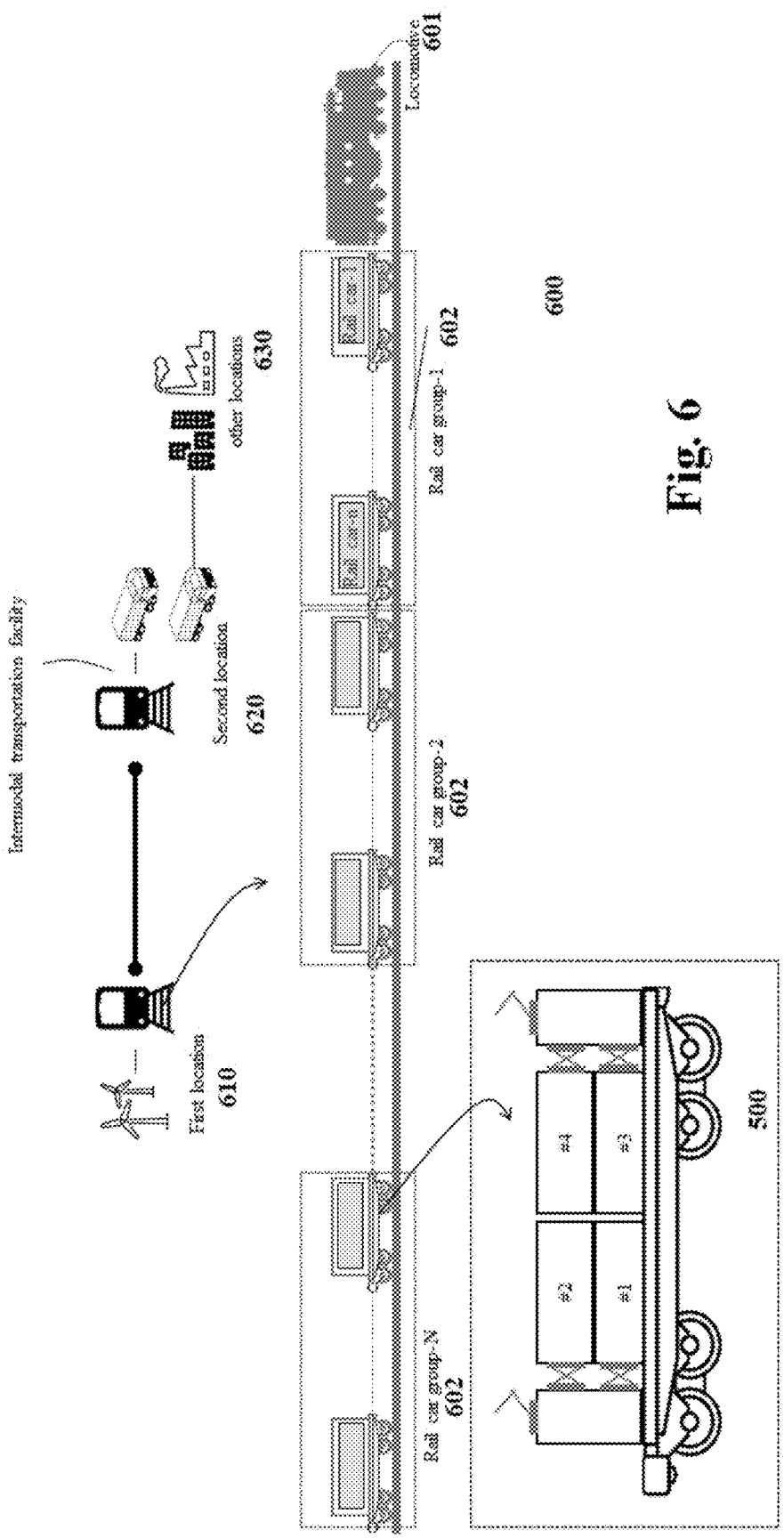
FIG. 6 illustrates another embodiment of a system for transporting bulk-energy-storage between two locations

FIG. 6 illustrates another embodiment of a system 600 for transporting bulk-energy-storage between two locations. At the first location 610, the transportable energy storage system on the rail vehicle system is charge for example from the wind in the night. The rail vehicle system arrives with substantially charged energy storage system at the second location 620, which is an intermodal transportation facility in which energy storage systems are detached from the rail car and loaded to trucks, for the end-use of energy at commercial and industrial facilities 630 about less than 100 miles from the second location 620. As an example, over a 1000 MWh energy delivery from one rail vehicle system at the intermodal transportation facility enables delivery of energy for 100s of commercial and industrial facility per day, transported to the facility by 100s of trucks, about 10 MWh/day. The truck fleet brings back the substantially discharged energy storage system to the intermodal facility for loading it back on to rail for charging overnight at the first location. Such roundtrip operation is repeated every day.

Figure 7:
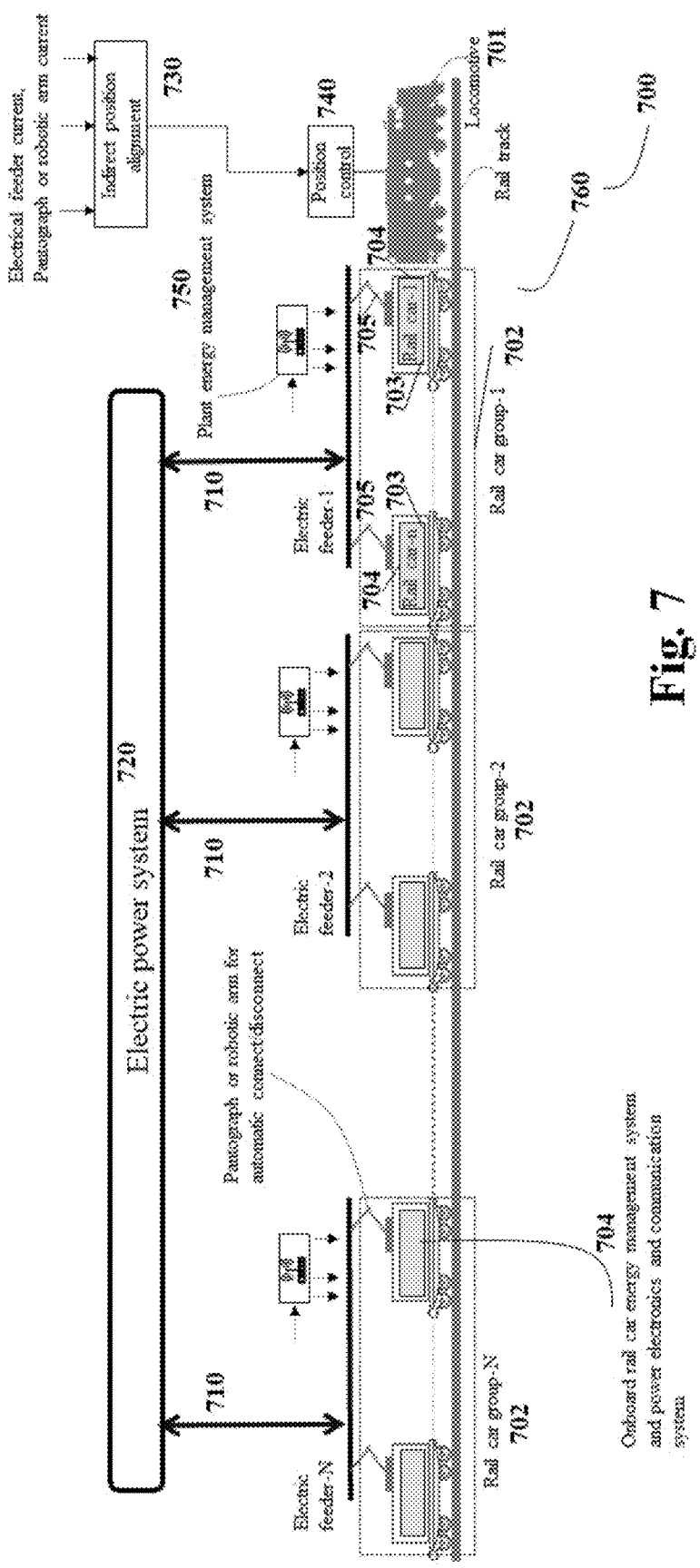
FIG. 7 illustrates another embodiment of position controls system for facilitating charging and discharging a transportable bulk-energy-storage, and a system for transporting bulk energy storage

FIG. 7 illustrates another embodiment of a system 700 in which the position controls device can be realized by an Indirect position alignment system 730 that receives the information of Electrical feeder currents by sensing currents in the feeders 710 as a function of number of Pantograph 705 engaged from each of the rail car 703. As an example, if Rail car group 702 is not aligned with its electrical feeder group 710 then either more than a predetermined value or less than a predetermined value of current will be observed in Electrical feeders 710 because one of the Electrical feeder 710 would receive the contact from either more than designed number of Pantographs 705 or less.

Figure 8:
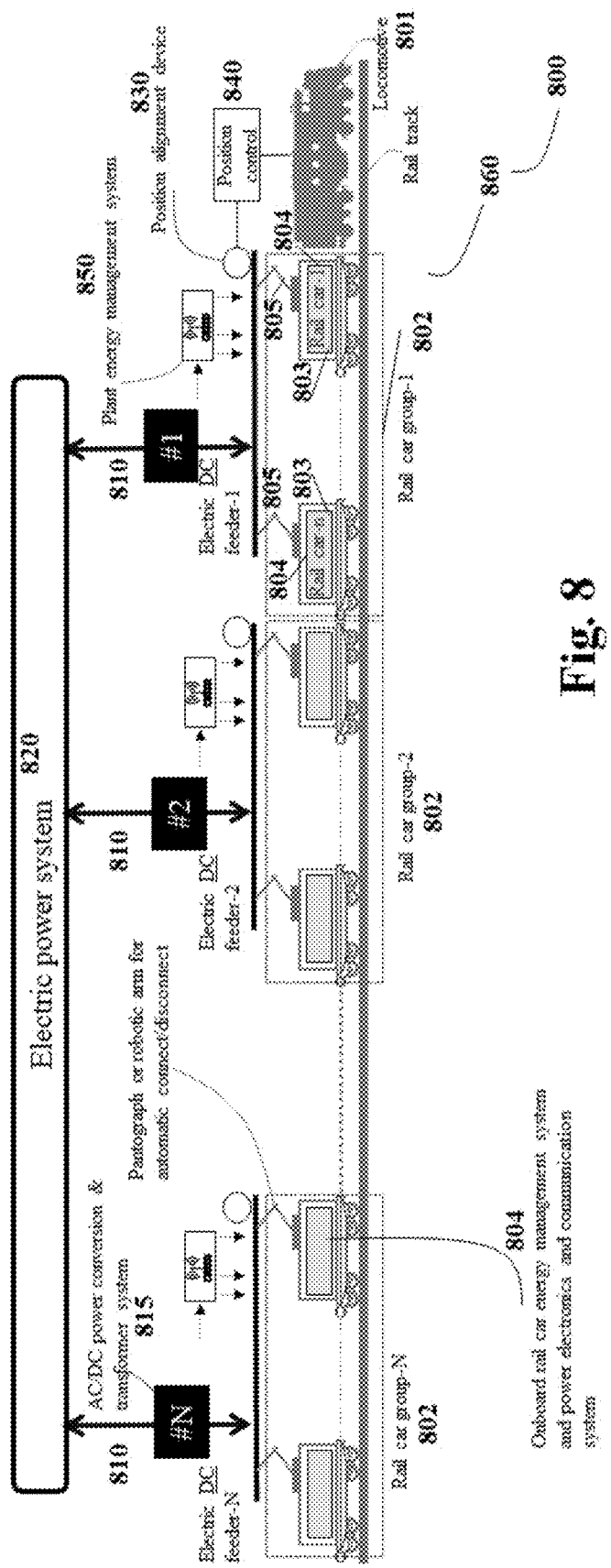
FIG. 8 illustrates another embodiment of a system for transferring power to or from a transportable bulk-energy-storage, and a system for transporting bulk energy storage using a DC feeder

FIG. 8 illustrates another embodiment of a system in which the Electrical feeders 810 are direct current (DC) feeders instead of a three-phase AC feeder. The DC feeders can be realized by a substantially stationary AC to DC power conversion system 815.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

While various embodiments of the disclosure have been described and illustrated, it is apparent that many modifications can be made without departing from the spirit and scope of disclosure. Accordingly, the illustrations, numerical values etc. used are merely examples and not limiting of the disclosure in any respect.

This written description uses examples to illustrate specific aspects of the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for exchanging power with a transportable bulk energy storage, said system comprising:
   at least one rail vehicle system comprising:
      at least one locomotive;
      at least one group of rail cars, said group of rail cars comprising at least one rail car;
   a plurality of electrical feeders, wherein said electrical feeders are:
      substantially stationary;
      configured to be coupled to their respective at least one group of rail cars of said at least one rail vehicle system; and substantially dedicated for exchanging electric power to said groups of rail cars of said at least one rail vehicle system;

at least one position control system, wherein said position control system is substantially dedicated to aligning the geographical position of said at least one rail car of said at least one rail vehicle system with the geographical position of said at least one electrical feeder;

said at least one rail car comprising:
  at least one electric energy storage system;
  at least one pantograph to connect to said at least one electrical feeder; and
  at least one power electronics system connected to said at least one pantograph;

at least one rail track infrastructure, wherein said rail track is:
  substantially aligned with geographical locations of the said at least one electrical feeder; and
  coupled to said at least one position control system;

at least one plant energy management system, wherein said at least one rail vehicle system comprises at least one rail car energy management system, wherein said rail car energy management system is configured to be coupled to said at least one energy storage system of the said at least one rail car; said at least one rail car energy management system is further configured to be coupled to said at least one plant energy management system; said at least one plant energy management system is configured to be coupled to a power system node;

wherein the system is configured to:
  facilitating communication among:
    the at least one plant energy management system;
    the at least one rail car management system; and
  performing sequential engagement of the pantographs of the rail cars to the respective electrical feeders to reduce the power system inrush current from the at least one power system node; and
  performing power flow controls between the at least one power system node and at least one energy storage system of the at least one rail car; and
  forecasting the available energy from the power system node over a period of time and then using this information to charge the selected energy storage system in respective rail cars, and not charge the remaining energy storage systems in their respective rail cars, and then facilitating the selection of a portion of rail cars of the rail vehicle system for transporting to another location.

2. A system for transporting bulk-energy-storage, said system comprising:
  at least one rail vehicle system comprising:
    at least one locomotive;
    at least one group of rail cars, said group of rail cars comprising at least one rail car;
  a plurality of electrical feeders at a first location;
  an intermodal transportation facility at a second location different than the first location;
  said electrical feeders are:
    substantially stationary;
    configured to be coupled to their respective at least one group of rail cars of said at least one rail vehicle system; and
    substantially dedicated for supplying three-phase electric power to said groups of rail cars of said at least one rail vehicle system,
  at least one position control system, wherein said position control system is substantially dedicated to aligning the geographical position of said at least one rail car of said at least one rail vehicle system with the geographical position of said at least one electrical feeder;
  said at least one rail car comprising:
    at least one electric energy storage system;
    at least one pantograph to connect to said at least one electrical feeder; and
    at least one power electronics system connected to said at least one pantograph;
  at least one rail track infrastructure, wherein said rail track is:
    substantially aligned with geographical locations of the said at least one electrical feeder; and
    coupled to said at least one position control system;
  at least one plant energy management system; said at least one rail vehicle system comprises at least one rail car energy management system, wherein said rail car energy management system is configured to be coupled to said at least one energy storage system of the said at least one rail car; said at least one rail car energy management system is further configured to be coupled to said at least one plant energy management system; said at least one plant energy management system is configured to be coupled to a power system node;
  wherein the system is configured to:
    transport the said at least one rail vehicle system from the said first location to the second location; and
    transport the said at least one rail vehicle system from the said second location to the first location: and
    perform sequential engagement of the pantographs of the rail cars to the respective electrical feeders to reduce the power system inrush current from the at least one power system node; and
    perform power flow controls between the at least one power system node and at least one energy storage system of the at least one rail car; and
    forecasting the available energy from the power system node over a period of time and then using this information to charge the selected energy storage system in respective rail cars, and not charge the remaining energy storage systems in their respective rail cars, and then facilitating the selection of a portion of rail cars of the rail vehicle system for transporting to another location.

3. A method of using the system of claim 2, said method comprising:
  forecasting the amount of energy transfer available at the said first location over a period;
  forecasting the amount of energy transfer available at the said second location over a period;
  performing economic optimization of buying and selling energy at the said first and the said second locations;
  determine the round-trip time of said at least one rail vehicle system between the first and second locations;
  calculating the charging and discharging time of the transportable energy storage in at least one rail vehicle system;
  determining the amount of energy transportable between the first location and the second location;
  facilitating communication among:
    the at least one plant energy management system;
    the at least one rail car management system; and
  performing the power exchange among the electrical feeders and the said energy storage systems of at least one rail cars;
  measuring the state of charge of energy storage systems;
  measuring the location of rail cars; and performing the prioritization of the engagement of respective rail cars connection to the electrical feeder for charging the selected energy storage system in respective rail cars, and not charge the remaining energy storage systems in their respective rail cars, and then facilitating the selection of a portion of rail cars of the rail vehicle system for transporting between the first and second locations.

4. A system for transporting electric power, said system comprising:
   at least one rail vehicle system comprising:
      at least one locomotive;
      at least one group of rail cars, said group of rail cars comprising at least one rail car;
   a plurality of electrical feeders at a first location;
   a plurality of electrical feeders at a second location different than the first location:
      said electrical feeders are:
         substantially stationary;
         configured to be coupled to their respective at least one group of rail cars of said at least one rail vehicle system; and
         substantially dedicated for transferring electric power to said groups of rail cars of said at least one rail vehicle system;
   at least one position control system, wherein said position control system is substantially dedicated to aligning the geographical position of said at least one rail car of said at least one rail vehicle system with the geographical position of said at least one electrical feeder;
   said at least one rail car comprising:
      at least one electric energy storage system;
      at least one pantograph to connect to said at least one electrical feeder; and
      at least one power electronics system connected to said at least one pantograph;
   at least one rail track infrastructure, wherein said rail track is:
      substantially aligned with geographical locations of the said at least one electrical feeder; and
      coupled to said at least one position control system;
   at least one plant energy management system; said at least one rail vehicle system comprises at least one rail car energy management system, wherein said rail car energy management system is configured to be coupled to said at least one energy storage system of the said at least one rail car; said at least one rail car energy management system is further configured to be coupled to said at least one plant energy management system; said at least one plant energy management system is configured to be coupled to a power system node;
   wherein the system is configured to:
      transport the said at least one rail vehicle system from the said first location to the second location; and
      transport the said at least one rail vehicle system from the said second location to the first location; and
      facilitating communication among;
         the at least one plant energy management system;
         the at least one rail car management system; and
      perform sequential engagement of the pantographs of the rail cars to the respective electrical feeders to reduce the power system inrush current from the at least one power system node; and
      perform power flow controls between the at least one power system node and at least one energy storage system of the at least one rail car; and
      forecasting the available energy from the power system node over a period of time and then using this information to charge the selected energy storage system in respective rail cars, and not charge the remaining energy storage systems in their respective rail cars, and then facilitating the selection of a portion of rail cars of the rail vehicle system for transporting to another location.

5. A method of using the system of claim 4, said method comprising:
   forecasting the amount of energy transfer available at the said first location over a period;
   forecasting the amount of energy transfer available at the said second location over a period;
   performing economic optimization of buying and selling energy at the said first and the said second locations;
   determine the round-trip time of said at least one rail vehicle system between the first and second locations;
   calculating the charging and discharging time of the transportable energy storage in at least one rail vehicle system;
   determining the amount of energy transportable between the first location and the second location;
   facilitating communication among:
      the at least one plant energy management system;
      the at least one rail car management system; and
   performing the power exchange between the electrical feeders and the said energy storage systems of at least one rail cars.

6. A method of using the system of claim 4, said method comprising:
   forecasting the amount of energy transfer available at the said first location over a period;
   forecasting the amount of energy transfer available at the said second location over a period;
   performing economic optimization of buying and selling energy at the said first and the said second locations;
   determine the round-trip time of said at least one rail vehicle system between the first and second locations;
   calculating the charging and discharging time of the transportable energy storage in at least one rail vehicle system;
   determining the amount of energy transportable between the first location and the second location;
   facilitating communication among:
      the at least one plant energy management system;
      the at least one rail car management system; and
   performing the power exchange between the electrical feeders and the said energy storage systems of at least one rail cars,
   measuring the state of charge of energy storage systems;
   measuring the location of rail cars; and
   performing the prioritization of the engagement of respective rail cars connection to the electrical feeder for charging the selected energy storage system in respective rail cars, and not charge the remaining energy storage systems in their respective rail cars, and then facilitating the selection of a portion of rail cars of the rail vehicle system for transporting between the first and second locations.

7. A method of using the system of claim 2, said method comprising:
   forecasting the amount of energy transfer available at the said first location over a period;
   forecasting the amount of energy delivery required at the said second location over a period;

performing economic optimization of buying energy at the said first location and selling energy at the said second locations;
determine the round-trip time of said at least one rail vehicle system between the first and second locations;
calculating the charging and discharging time of the transportable energy storage in at least one rail vehicle system;
determining the amount of energy transportable between the said first location and the said second location;
facilitating communication among:
  the at least one plant energy management system;
  the at least one rail car management system; and
performing the power exchange among the electrical feeders and the said energy storage systems of at least one rail cars.

* * * * *